May 5, 1970  W. E. ELDRED  3,509,614
METHOD OF MAKING A FILAMENT WHEEL
Original Filed Jan. 17, 1966  3 Sheets-Sheet 1

INVENTOR.
WENDELL E. ELDRED
BY
Plante, Arens, Hartz, Hix and Smith
ATTORNEYS

May 5, 1970           W. E. ELDRED           3,509,614

METHOD OF MAKING A FILAMENT WHEEL

Original Filed Jan. 17, 1966           3 Sheets-Sheet 2

INVENTOR.
WENDELL E. ELDRED
BY
*Plante, Arens, Hartz, Hix and Smith*
ATTORNEYS

INVENTOR.
WENDELL E. ELDRED
BY
Plante, Arens, Hartz, Hix and Smith
ATTORNEYS

United States Patent Office 3,509,614
Patented May 5, 1970

3,509,614
METHOD OF MAKING A FILAMENT WHEEL
Wendell E. Eldred, South Bend, Ind., assignor to The Bendix Corporation, a corporation of Delaware
Original application Jan. 17, 1966, Ser. No. 521,089, now Patent No. 3,357,747, dated Dec. 12, 1967. Divided and this application Aug. 7, 1967, Ser. No. 658,784
Int. Cl. B21d 53/26; B21k 1/28
U.S. Cl. 29—159                               4 Claims

ABSTRACT OF THE DISCLOSURE

A method for constructing a filament wheel comprising bands of filaments integrated by a binder wrapped into a toroidal body thereafter severed providing sections that are placed back-to-back with their severed edges facing outwardly and joined.

RELATED PATENTS

This application is a divisional application of U.S. patent application Ser. No. 521,089 filed Jan. 17, 1966, now Patent No. 3,357,747.

SUMMARY

In the fabrication of high strength structures from reinforced plastics, there are a variety of fabrication techniques with a large range of physical properties. Of the many methods, filament winding has proved to be far the strongest. Therefore, it is a principal object of this invention to provide a wheel construction which utilizes resin encased filaments to provide a lightweight, strong and yet economical wheel.

DRAWING DESCRIPTION

Other and more detailed objects and advantages of my invention will appear to those skilled in the art from the following description of the drawings in which.

DETAILED DESCRIPTION

Figure 1:
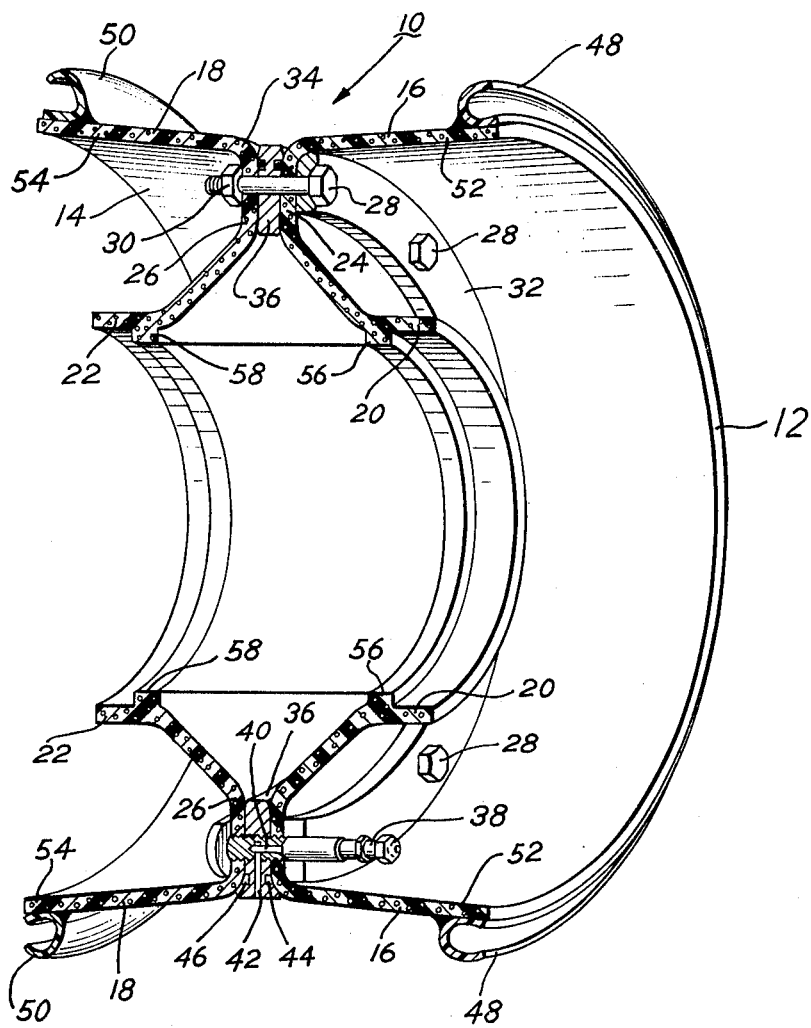
FIGURE 1 shows an isometric cross section view of a filament wheel constructed in accordance with the principles of my invention.

With more particular regard to FIGURE 1, there is shown a wheel construction 10 that is made up from a first resin encased filament section 12 and a second resin encased filament section 14, each of which is provided with an upper surface 16 or 18 and a lower surface 20 or 22 that are respectively joined by center body portions 24 and 26.

The center body portions 24 and 26 are joined together by a plurality of equidistantly arranged bolts 28 that pull the sections together upon the tightening of nuts 30 therefor. Underneath the bolt heads and the nuts there is provided annular reinforcing rings 32 and 34, to prevent the bolt heads and/or nuts from digging into the resin encased filament sections 12 or 14, and to provide more uniform stress distribution. Rings 32 and 34 may be loose or bonded to portions 24 and 26.

Between the center bodies there may be provided an annular sealing ring 36 to seal the assembly of the sections 12 and 14. There may also be provided in this ring 36 a means for communicating fluid pressure from externally of the wheel through the ring 36 to the chamber of the tire that may be mounted thereon (not shown) such as by means of a valve stem 38 that performs the dual function of a tightening means for joining the sections 12 and 14 and due to the internal passage 40 thereof that communicates with an outwardly directed passage 42 in the ring 36 provides the fluid communication aforementioned.

Furthermore, the ring 36 is provided with a plurality of grooves on opposite faces thereof into which appropriate seals 44 and 46, such as O-rings may be inserted to complete the sealing of the juncture of the sections 12 and 14.

To the upper surfaces 16 and 18, there is bonded thereto a pair of rings 48 and 50, as at 52 and 54, by a high shear bonding substance. On the inner surfaces 20 and 22 of the respective sections 12 and 14, there is also provided depending stops 56 and 58 for the insertion of bearings to support the wheel 10 on an axle.

Figure 2:
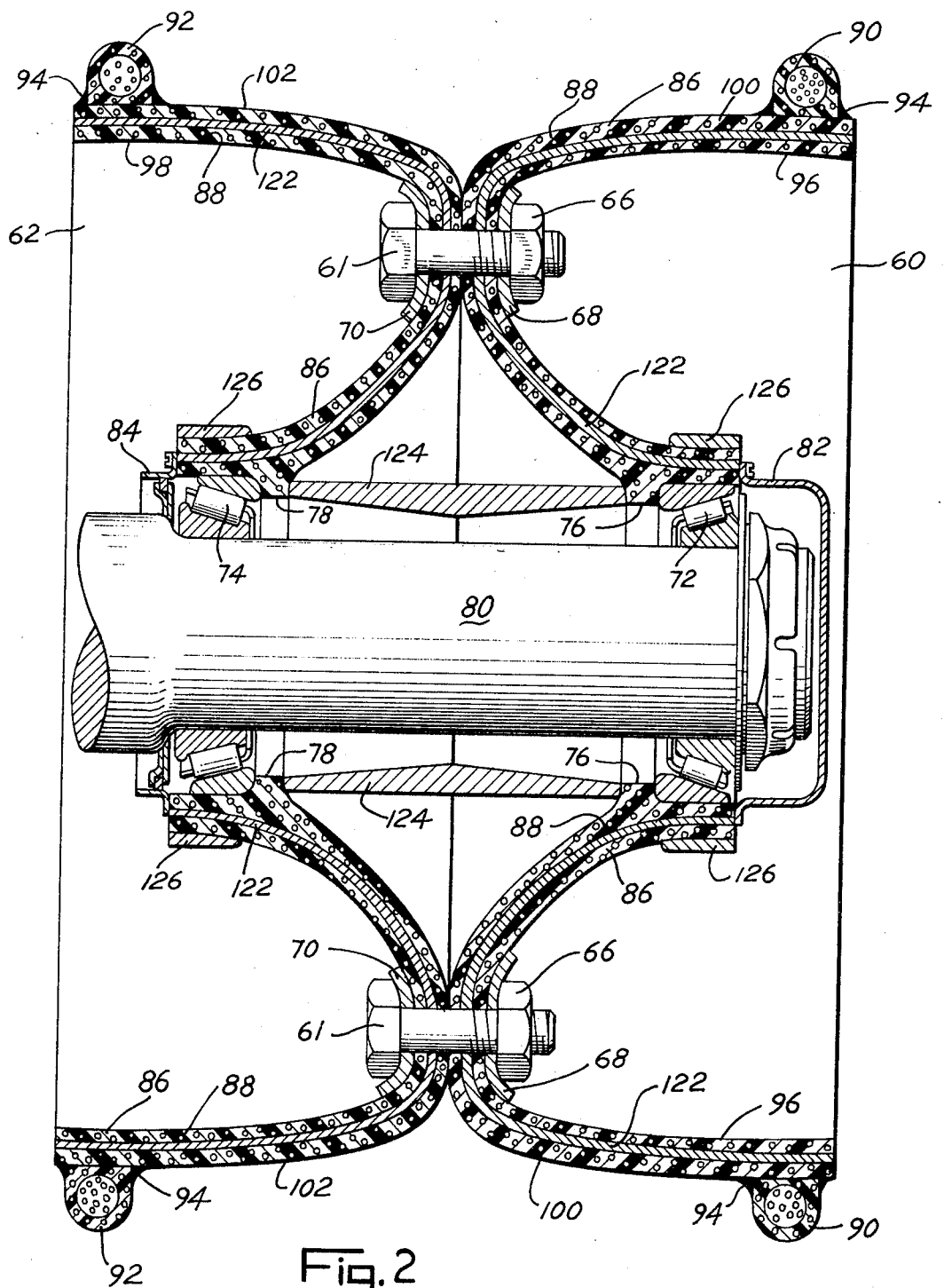
FIGURE 2 shows a cross sectioned front view of a wheel similar to that of FIGURE 1 mounted upon an axle for rotation thereabout.

With regard to FIGURE 2, there is shown a similar wheel construction having first and second sections 60 and 62, respectively, joined by the bolt 61 for a nut 66 with bearing or washer rings 68 and 70, as in FIGURE 1. Furthermore, the wheel is provided with right and left bearings 72 and 74 which are placed against the depending stops 76 and 78 of the lowermost surfaces of the wheel sections. These bearings support the wheel from an axle 80, and appropriate dust covers 82 and 84 are bolted to the wheel sections to prevent contamination of the bearings.

In FIGURE 2 the first and second sections 60 and 62 are shown in slightly enlarged detail so that the filaments 86 may be seen in the cross sectional cut to be surrounded by resin 88. The filaments 86 and resin 88 are generally wrapped to cover a surface of a toroid with a helical pattern of filaments with layers of resin running in one direction first and then in another to form multiple encased filaments. The wrapping of the filaments may be at a constant angle or at different angles dependent on the shape and loading required for the wheel.

As in FIGURE 1, a pair of annular beads 90 and 92 are bonded by a high shear strength bond composition 94 to the uppermost surfaces of the sections 60 and 62. It is preferred, although not necessarily required, that the beads 90 and/or 92 be formed to have a flat inner surface 96 and 98 that will mate with the upper or outer surfaces of the sections 60 and 62. Furthermore, the upper or outer surfaces 100 or 102 are formed to have a slight upward angle which, for example, has thus far been programmed as a 5 degree taper from the inner to the outermost portions of the upper surface to give a general convex profile to the wheel. At the same time, the flat inner surfaces 96 and 98 of the beads 90 and 92 are dimensioned to have a lesser internal diameter than the external diameter of the edges of the section 60, 62 so that the flat surfaces 96 and 98 will create inward forces on the outermost edges of the section 60 and 62 upon the bonding thereto. This will have the effect of providing a wedge fit between the beads 90 and 92 and the sections 60 and 62, respectively, that will be further enhanced when a tire is mounted and inflated on the wheel.

Figure 3:
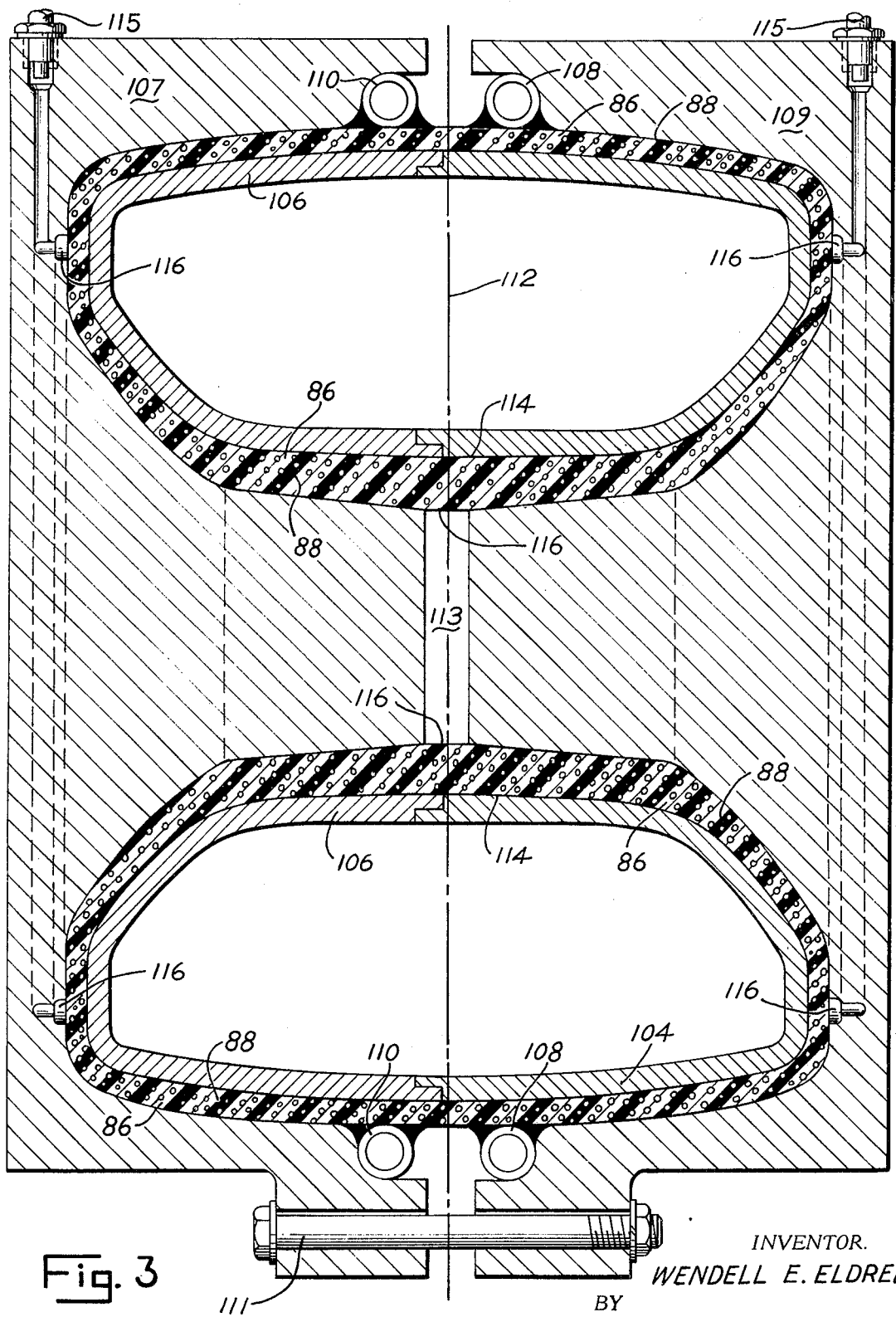
FIGURE 3 shows a cross sectioned view of a mandrel and a toroidal ring of resin encased filaments in a sizing mold during the fabrication of a wheel in accordance with the principles of my invention.

The method of construction for manufacturing a wheel in accordance with the foregoing description is to first wind a tape or band of resin encased filaments in a toroidal shape upon a suitable mandrel as seen in FIGURE 5, having two sections 104 and 106. It should be noted that the outermost surfaces of the shells 104 and 106 are provided with an incline to allow the finished laminate of filaments 86 and resin 88 to have an outer surface which is angled upwardly toward the center of the toroidal mandrel. After the winding of the band of filaments 86 and the encasing resin 88, about the shells 104 and 106 by either a wet or pre-peg method, which are familiar to those skilled in the art, auxiliary toroidal rings 108 and 110, which will in the finished product act in a similar manner as to the beads aforedescribed, and which rings 108 and 110 may have been previously fabricated by a spiral wrap about a foam or other type permanent core and cured or partially cured. The cross section of rings 108 and 110 may be round, of a D-shape or any other variation including the open C-section of FIGURE 1. If they are preformed, then they are slipped over the primary toroidal fabrication of filaments and resin and wedged up against the tapered center portion with a gap left between them (as illustrated in FIGURE 3). These auxiliary rings may be then further affixed by additional circumferential windings, if desired, or merely bonded in place with a resin. The entire assembly is then cured in an oven for a suitable time at a predetermined temperature to effect proper curing of the thermo-setting type resin used. While curing, the assembly (in a preferred method of fabrication) is placed in a curing mold having sections 107 and 109 joined annularly by bolts 111 that will encapsulate the toroid and be adjustable during the curing process by the tightening of bolts 111 so as to size the wrapped product to assure that the external radial faces will be flat and true having a predetermined theoretically desired density. In this regard, spaces 113 are provided centrally to permit escape of excess resins, and the molds will further position rings 108 and 110. Upon completion of the curing and cooling, the bolts 111 are removed and air is introduced via fittings 115 to cause pistons 116 to release the sections 107 and 109 from the wrapped product so that it may then be cut in two halves along the vertical centerline 112 on the inside and outside peripheries, as at 114 and 116. Further machining may be done at this time or later to make the inside faces of suitable shape for bearing seats, such as the formation of the depending stops 76 and 78 (see FIGURE 2) for anti-friction or other type bearings. These two halves are then reversed and placed back-to-back with their open sides out so that the original outside faces that are closed are abutting each other and are clamped together by a suitable number of bolts, as aforedescribed; and a pair of circumferential rings, which may be of metal or other suitable materials including reinforced plastic, can be used as shown.

This cutting and reversing of the toroid is one of the primary features which leads to an economical practice of the invention in that it provides a high strength filament wound structure of the proper shape and properties particularly suitable for mounting pneumatic tires, bearings and carrying the associated loads.

While the invention was primarily conceived for aircraft wheels, it would also prove quite suitable for many other types of wheels utilizing both solid and pneumatic tires wherever lightweight and high strength is required. Some of the advantages of the invention are as follows:

(1) A very high strength-to-weight ratio that can be varied to meet the needs of the industry in accordance with predetermined specifications.

(2) Adaptable for both symmetrical and unsymmetrical wheels.

(3) Ability to supply ample space for brakes within the wheel contour.

(4) Suitable for low cost production by high speed automated winding machines.

(5) Provide wheels with thermal conductivity much lower than present wheel that will protect the tires from brake heat.

(6) Easily adapted to utilization of supporting axial reinforcing cross tubes.

(7) Readily attached reinforcements for brake key ways or other parts as required.

(8) Eliminates problems of corrosion encountered frequently in aircraft service.

(9) Can be designed for varying degrees of flexibility so that obstacles such as cables on carrier base ships can be swallowed without permanent set.

(10) Conversely, if additional stiffness is required, this may be secured by utilizing a filament of high tensile modulus of elasticity or by laying suitable core material between the inner and outer layers of the reinforcing filaments during winding.

(11) Expensive and long lead time forging dies are eliminated.

In accordance with the advantage of paragraph (5) above and while the construction previously described is one which will be of lesser heat conductivity than any of the previous wheels known in the prior art, it may be required to further provide heat protection for a wheel and in so doing, it is quite feasible to interpose, in the various layers, reflective foils or heat barrier material as well as to coat or bond a heat reflective substance to the underneath side of the tapered upper surfaces for the wheel sections. As seen in FIGURE 2, such a practice could well entail the insertion of a reinforcement 122 during the wrapping process which will enable altering the strength-to-weight ratio while providing secondarily a heat barrier within the wheel.

In some wheel designs it may be necessary to utilize reinforcing inserts 124 (see FIGURE 2) by attaching it to the assembled wheel to provide an additional support for the stops 76 and 78. This tube could be made from metal stock or preferably fabricated from reinforced plastic to provide the desired strength-to-weight ratio. In addition, a bearing insert 126 may be fitted and joined, when desired, to the area of the wheel overlying the bearings for additional support.

As I have mentioned previously, this invention is not intended to be limited to the particular feature aforedescribed, but is rather to have its meets and bounds set by the following claims.

I claim:

1. A method of forming a wheel comprising the steps of:
   wrapping multiple layers of resin encased filaments about a toroidal mandrel;
   dividing said layers of filaments into two sections each of which has an open end and a closed end;
   placing said sections with their closed ends in abutting relationship; and
   joining said abutting closed ends together.

2. A method of forming a wheel according to claim 1 and further comprising the step of placing annular rings on the outermost layer of the multiple layers of filaments in towards the center of the toroidal mandrel.

3. A method of forming a reinforced plastic wheel according to claim 2 and further comprising the step of placing said multiple layers of filaments and said rings in a compression mold to size said multiple layers and locate said rings with means to remove excess resin and cure said resin encased filaments prior to the step of dividing said layers into two sections.

4. A method of forming a wheel according to claim 3 wherein the wrapping of multiple layers of resin encased filaments includes the step of laying said filaments on said toroidal mandrel in a spiral pattern so that the filaments are provided with optimum load carrying ability.

References Cited

UNITED STATES PATENTS

| | | | |
|---|---|---|---|
| 968,272 | 8/1910 | Sextone | 29—416 |
| 2,120,881 | 6/1938 | Assbroicher et al. | 29—416 |
| 2,448,114 | 8/1948 | Olson et al. | 156—189 |
| 2,998,282 | 8/1961 | Moyer. | |
| 3,023,135 | 2/1962 | Wiltshire | 156—189 XR |
| 3,369,843 | 2/1968 | Prew | 301—63 |
| 3,423,816 | 1/1969 | Crosh et al. | 29—416 |

CHARLIE T. MOON, Primary Examiner

U.S. Cl. X.R.

29—415, 416, 463